US010529059B2

(12) United States Patent
Huang et al.

(10) Patent No.: US 10,529,059 B2
(45) Date of Patent: Jan. 7, 2020

(54) VISION CORRECTING DISPLAY WITH ABERRATION COMPENSATION USING INVERSE BLURRING AND A LIGHT FIELD DISPLAY

(71) Applicants: The Regents of the University of California, Oakland, CA (US); The Massachusetts Institute of Technology, Cambridge, MA (US)

(72) Inventors: Fu-Chung Huang, Bellevue, WA (US); Gordon Wetzstein, Cambridge, MA (US); Brian Barsky, Berkeley, CA (US); Ramesh Raskar, Cambridge, MA (US)

(73) Assignees: The Regents of the University of California, Oakland, CA (US); The Massachusetts Institute of Technology, Cambridge, MA (US)

(*) Notice: Subject to any disclaimer, the term of this patent is extended or adjusted under 35 U.S.C. 154(b) by 23 days.

(21) Appl. No.: 14/823,906

(22) Filed: Aug. 11, 2015

(65) Prior Publication Data
US 2016/0042501 A1 Feb. 11, 2016

Related U.S. Application Data

(60) Provisional application No. 62/035,966, filed on Aug. 11, 2014.

(51) Int. Cl.
*G06T 5/00* (2006.01)
*G02B 27/22* (2018.01)
*G02B 27/00* (2006.01)

(52) U.S. Cl.
CPC .......... *G06T 5/003* (2013.01); *G02B 27/0025* (2013.01); *G02B 27/0075* (2013.01);
(Continued)

(58) Field of Classification Search
None
See application file for complete search history.

(56) References Cited

U.S. PATENT DOCUMENTS 5,959,664 A * 9/1999 Woodgate .......... G02B 27/0093
348/51
6,536,907 B1 * 3/2003 Towner .................. H04N 5/335
348/745
(Continued)

OTHER PUBLICATIONS

Huang, Fu-Chung, and Brian A. Barsky. *A framework for aberration compensated displays*. Tech. Rep. UCB/EECS-2011-16, 2011.
(Continued)

*Primary Examiner* — Said Broome
(74) *Attorney, Agent, or Firm* — Leydig, Voit & Mayer, Ltd.; Gerald T. Gray

(57) ABSTRACT

Systems and methods for compensating for at least one optical aberration in a vision system of a viewer viewing a display. Image data for an image to be displayed is received, at least one parameter related to at least one optical aberration in the vision system of a viewer is received and an aberration compensated image to be displayed is computed based on the at least one received parameter related to the vision system of a viewer and on at least one characteristic of the light field element. The aberration compensated image is displayed on the display medium, such that when a viewer whose vision system has the at least one optical aberration views the aberration compensated image displayed on the display medium through a light field element, the aberration compensated image appears to the viewer with the at least one aberration reduced or eliminated.

20 Claims, 13 Drawing Sheets

(52) U.S. Cl.
CPC .................. *G02B 27/2214* (2013.01); *G06T 2207/20172* (2013.01); *G06T 2210/36* (2013.01); *G06T 2210/41* (2013.01)

(56) References Cited

U.S. PATENT DOCUMENTS

| | | | | |
|---|---|---|---|---|
| 7,973,850 B2* | 7/2011 | Ishiga | .................. | H04N 5/3572 348/222.1 |
| 8,164,598 B2* | 4/2012 | Kimpe | .................. | G09G 3/20 345/204 |
| 2009/0290132 A1* | 11/2009 | Shevlin | .................. | G02B 26/06 353/69 |
| 2011/0157180 A1* | 6/2011 | Burger | .................. | A61B 3/0041 345/428 |
| 2012/0113389 A1* | 5/2012 | Mukai | .................. | A61B 3/1015 351/208 |
| 2012/0262477 A1* | 10/2012 | Buchheit | .................. | G09G 5/00 345/619 |

OTHER PUBLICATIONS

Huang, Fu-Chung, et al. "Correcting for optical aberrations using multilayer displays." *ACM Transactions on Graphics (TOG)* 31.6 (2012): 185.

Maimone, Andrew, et al. "Focus 3D: Compressive accommodation display." *ACM Trans. Graph.* 32.5 (2013): 153-1.

Pamplona, Vitor F., et al. "Tailored displays to compensate for visual aberrations." (2012).

* cited by examiner

Figure 1: *Vision correction with computational displays.*

Figure 2: *Illustration of vision-correcting displays.*

Figure 3: *Light field analysis for different displays.*

Figure 4: *Light field prefiltering.*

Figure 5: *Conditioning analysis.*

Figure 6: *Tradeoff between angular light field resolution and image contrast.*

Figure 7: *Compensating for a range of lateral viewpoints.*

Figure 8: *Accounting for a range of viewing distances.*

Figure 10: *Photographs of prototype display.*

Figure 11: *Evaluation and comparison to previous work.*

Figure 12: *Correcting for higher-order aberrations.*

VISION CORRECTING DISPLAY WITH ABERRATION COMPENSATION USING INVERSE BLURRING AND A LIGHT FIELD DISPLAY

CROSS-REFERENCE TO RELATED APPLICATIONS

This patent application claims the benefit of U.S. Provisional Patent Application No. 62/035,966, filed Aug. 11, 2014, which is incorporated herein by reference.

This invention was made with government support under Grant Numbers U.S. Pat. No. 1,116,452 an U.S. Pat. No. 1,219,241 awarded by the National Science Foundation. The government has certain rights in the invention.

BACKGROUND

The present disclosure relates to vision correcting systems and more specifically to vision correcting computational light field image display systems and methods. The various embodiments enable a vision correcting display that compensates for aberrations using inverse blurring and a light field display.

Today, millions of people worldwide suffer from myopia. Eyeglasses have been the primary tool to correct such aberrations since the 13th century. Recent decades have seen contact lenses and refractive surgery supplement available options to correct for refractive errors. Unfortunately, all of these approaches are intrusive in that the observer either has to use eyewear or undergo surgery, which can be uncomfortable.

Since their introduction to computer graphics, light fields have become one of the fundamental tools in computational photography. Frequency analyses for instance, help better understand the theoretical foundations of ray-based light transport whereas applications range from novel camera designs and aberration correction in light field cameras, to low-cost devices that allow for diagnosis of refractive errors or cataracts in the human eye. These applications are examples of computational ophthalmology, where interactive techniques are combined with computational photography and display for medical applications.

Glasses-free 3D or light field displays were invented in the beginning of the 20th century. The two dominating technologies are lenslet arrays and parallax barriers. Today, a much wider range of different 3D display technologies are available, including volumetric displays, multifocal displays, and super-multi-view displays. Volumetric displays create the illusion of a virtual 3D object floating inside the physical device enclosure; the lens in the eye of an observer can accommodate within this volume. Multifocal displays enable the display of imagery on different focal planes but require either multiple devices in a large form factor or varifocal glasses to be worn. Super-multi-view displays emit light fields with an extremely high angular resolution, which is achieved by employing many spatial light modulators. Most recently, near-eye light field displays and compressive light field displays have been introduced. With one exception (MAIMONE, A., WETZSTEIN, G., HIRSCH, M., L A:—IMAN, D., RASKAR, R., AND FUCHS, H. 2013. Focus 3d: Compressive accommodation display. ACM Trans, Graph. 32, 5, 153:1-153:13.), none of these technologies is demonstrated to support accommodation.

Building light field displays that support all depth cues, including binocular disparity, motion parallax, and lens accommodation, in a thin form factor is one of the most challenging problems in display design today. The support for lens accommodation allows an observer to focus on virtual images that float at a distance to the physical device. This capability would allow for the correction of low-order visual aberrations, such as myopia and hyperopia.

Devices tailored to correct visual aberrations of human viewers have recently been introduced. Early approaches attempt to pre-sharpen a 2D image presented on a conventional screen with the inverse point spread function (PSF) of the viewer's eye. Although these methods slightly improve image sharpness, the problem itself is ill-posed. Fundamentally, the PSF of an eye with refractive errors is usually a low-pass filter—high image frequencies are irreversibly canceled out in the optical path from display to the retina. To overcome this limitation, the use of 4D light field displays with lenslet arrays or parallax barriers to correct visual aberrations was proposed by Pamplona et al. (PAMPLONA, V., OLIVEIRA, M., ALIAGA, D., AND RASKAR, R.2012. "Tailored displays to compensate for visual aberrations." ACM Trans. Graph. (SIGGRAPH) 31.). For this application, the emitted light fields must provide sufficiently high angular resolution so that multiple light rays emitted by a single lenslet enter the same pupil (see FIG. 2). This approach can be interpreted as lifting the problem into a higher-dimensional (light field) space, where the inverse problem becomes well-posed.

Unfortunately, conventional light field displays as used by Pamplona et al. are subject to a spatio-angular resolution trade-off; that is, an increased angular resolution decreases the spatial resolution. Hence, the viewer sees a sharp image but at the expense of a significantly lower resolution than that of the screen. To mitigate this effect, Huang et al. (see, HUANG, F.-C., AND BARSKY, B. 2011. A framework for aberration compensated displays. Tech. Rep. UCB/EECS-2011-162, University of California, Berkeley, December; and HUANG, F.-C., LANMAN, D., BARSKY, B. A., AND RASKAR, R. 2012. Correcting for optical aberrations using multi layer displays. ACM Trans. Graph. (SiGGRAPH Asia) 31, 6, 185:1-185:12. proposed to use multilayer display designs together with prefiltering. Although this is a promising, high-resolution approach, the combination of prefiltering and these particular optical setups significantly reduces the contrast of the resulting image.

Pamplona et al. explore the resolution-limits of available hardware to build vision-correcting displays; Huang et al. [2011; 2012] show that computation can be used to overcome the resolution limits, but at the cost of decreased contrast. Accordingly it is desired to provide improve improved vision-correcting display solutions.

SUMMARY

The present disclosure relates to vision correcting systems and more specifically to vision correcting computational light field image display systems and methods.

The present embodiments provide combinations of viewer-adaptive prefiltering with off-the-shelf lenslet arrays or parallax barriers and provide a vision-correcting computational display system that facilitates significantly higher contrast and resolution as compared to previous solutions (see FIG. 1). Certain embodiments employ 4D light field prefiltering with hardware designs that have previously only been used in a "direct" way, i.e. each screen pixel corresponds to one emitted light ray. Embodiments herein allow for significantly higher resolution as compared to the "direct" method because they decrease angular resolution demands. Moreover, image contrast is significantly increased compared to previous prefiltering approaches.

A vision correcting display device digitally produces a transformed image that will appear in sharp focus when viewed by the user without requiring the use of eyewear such as eyeglasses or contact lenses. The method involves prefiltering algorithms in concert with a light field display. A vision correcting display digitally modifies the content of a display, performing computations based on specifications or measurements of the optical aberrations of the user's eye. This approach provides an eyeglasses-free and contacts-free display for many people. Vision correction could be provided in some cases where eyeglasses are ineffective. Another application is a display that can be viewed with single-vision eyewear for viewers who otherwise would require bifocal correction. Vision-correcting displays of the present embodiments have many uses including, but not limited to, clock faces, watch screens, wrist-worn screens, cell phone screens, mobile phone screens, smartphone screens, tablet display screens, laptop display screens, computer monitors, computer display screens, e-readers, display screens on cameras, and display screens on video cameras.

Although light field displays have conventionally been used for glasses-free 3D image presentation, correcting for visual aberrations of viewers is a promising new direction with direct benefits for millions of people. The present embodiments offer practical display devices that provide both high resolution and contrast, the two design criteria that have been driving the display industry for the last decade. The display systems can be integrated systems comprising flexible optical configurations combined with sophisticated computing that allow for different modes, such as 2D, glasses-free 3D, or vision-correcting image display.

The present embodiments advantageously provide:
1. Eyeglasses-free and contacts-free displays for people with vision problems that can be corrected by single-vision eyeglasses or contact lenses;
2. Vision correction for people whose vision cannot be corrected with eyeglasses because their vision has higher-order optical aberrations; and
3. Displays that can be viewed with single-vision eyewear for viewers who otherwise would require bifocal correction; this is particularly important for instruments or gauges or displays in a vehicle for the use of an operator of the vehicle.

According to one embodiment, a method is provided for compensating for one or several optical aberrations in the vision system of a viewer who is viewing a display. The display typically includes a light field element and a display medium including an array of pixels. The method typically includes receiving at least one parameter related to at least one optical aberration in the vision system of the viewer and receiving image data for an image or sequence of images to be displayed, said image data including pixel values. The method also typically includes computing an aberration compensated image to be displayed based on one or several received parameters related to the vision system of a viewer and on at least one characteristic of the light field element. The method further typically includes displaying or rendering the aberration compensated image on the display medium, such that when viewed through the light field element, the aberration compensated image displayed on the display medium appears to the viewer with the above-referenced optical aberration or aberrations reduced or eliminated. In this manner, the method advantageously compensates for one or several optical aberrations in the vision system of the viewer.

According to another embodiment, a display device is provided that compensates for one or several optical aberrations in the vision system of a viewer who is viewing a display. The display device typically includes a display medium comprising an array of pixels, a light field element, and a processor element. The processor element is typically configured to receive image data for an image to be displayed, the image data including pixel values, and configured to compute an aberration compensated image based on at least one input parameter related to one or several optical aberrations in the vision system of the viewer and also based on at least one characteristic of the light field element. The processor element is also typically configured to render the aberration compensated image on the display medium, such that when viewed through the light field element, the aberration compensated image displayed on the display medium appears to the viewer with said optical aberration or aberrations reduced or eliminated. In this manner, the device advantageously compensates for the optical aberration or aberrations in the vision system of the viewer.

In certain aspects, the aberration or aberrations are lower order aberrations. In certain aspects, the aberration or aberrations are higher order aberrations. In certain aspects, aberrations include at least one lower order aberration and at least one higher order aberration. In certain aspects, the lower order aberration or aberrations include one or more of piston, tip (prism), tilt (prism), defocus and astigmatism. In certain aspects, the higher order aberration or aberrations include one or more of trefoil, coma, quadrafoil, secondary astigmatism, and spherical aberration.

In certain aspects, the parameter or parameters include a focal length, f, of the viewer's eye. In certain aspects, the light field element includes a parallax barrier mask. In certain aspects, the parallax barrier mask is a pinhole array. In certain aspects, the light field element includes an element including lenses. In certain aspects, the lenses are arranged in a rectangular grid. In certain aspects, the lenses are arranged in a honey-comb pattern. In certain aspects, the lenses are arranged in some other pattern that is non-rectangular and is not a honey-comb pattern. In certain aspects, the light field element includes one of a microlens array, a lenslet array, a lenticular array, a lenticular lens, or a lenticular screen.

In certain aspects, the at least one characteristic of the light field element includes an offset distance between the light field element and the display medium and/or a distance between features of the light field element. In certain aspects, the distance between features includes a distance between lenslets, or a distance between pinholes.

In certain aspects, computing an aberration compensated image includes applying an inverse blurring algorithm to the image data. In certain aspects, the display medium includes one of a clock face, a watch screen, wrist-worn screen, cell phone screen, mobile phone screen, smartphone screen, a tablet display screen, a laptop display screen, a computer monitor, a computer display screen, an e-reader, display screen on a camera, display screen on a video camera, heads-up display, near eye display, television, phablet, notebook display, personal computer display, automotive/locomotive/trucking display (cluster display/navigation/center console etc.), navigation device display, watch display, wearable device display, projection system display, desktop display, assistive aid devices for legally blind people, portable gaming device, portable media player (DVD player/iPod/etc.), display used in flights (entertainment/informational displays. In certain aspects, the display medium is a projection display. In certain aspects, the display medium comprises one of a heads-up display or near-eye display. In certain aspects, the display medium includes one of a television or home theater display. In certain aspects, the display medium is an instrument or gauge or display in a vehicle, including, but not limited to a bicycle, motorcycle, automobile, aircraft, watercraft, or locomotive. In certain aspects, the display medium is provided for the use of an operator of the vehicle, for the use of a passenger in the vehicle, for the use of an operator and a passenger in the vehicle. In certain aspects, the display medium includes one of instruments and gauges reporting vehicle status data, navigation systems, and entertainment systems. In certain aspects, the display medium is a touch-screen display.

In certain aspects, an intensity value of a pixel of the aberration compensated image is a function of intensity values of multiple pixels of the image data. In certain aspects, the image data includes picture data and/or text data. In certain aspects, the method incorporates sensor data from a sensor about a viewer situation including, but not limited to, position, location, distance to the device, orientation, and eye gaze direction. In certain aspects, the sensor is an eye-tracker. In certain aspects, pixel values are directly assigned to the solution image.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

The present disclosure presents a computational display approach to correcting low and high order visual aberrations of a human viewer. In certain aspects, rather than a viewer wearing vision-correcting glasses, the display itself predistorts the presented imagery so that it appears as a desired target image on the retina of the viewer. The display architecture can employ off-the-shelf hardware components, such as printed masks or lenslet arrays, combined with computational light field prefiltering techniques.

The present embodiments are capable of a wide range of possible implementations for devices such as phones, tablets, televisions, and head-worn displays. Examples of displays for which the embodiments of the present invention are particularly useful include heads-up displays, near eye displays, televisions, cell phone/smartphones, tablets, eReaders, Phablets, laptops, notebooks, personal computer displays, automotive/locomotive/trucking displays (cluster display/navigation/center console etc.), navigation device displays, watch displays, wearable device displays, projection system displays, desktop displays, assistive aid devices for legally blind people, portable gaming devices, portable media players (DVD player/iPod/etc.), displays used in flights (entertainment/informational displays). As described herein, one particular implementation using a low-cost hardware add-on to a conventional phone is discussed. In a commercial setting, the present embodiments could be implemented using switchable liquid crystal barriers, similar to those used by Nintendo 3DS, which would allow the display to dynamically adapt to different viewers or viewing conditions.

In certain embodiments, the precise location of the viewer's eye with respect to the screen is either fixed or tracked. The present embodiments offer significantly increased resolution and contrast compared to prior vision-correcting displays. Intuitively, light field prefiltering minimizes demands on angular light field resolution, which directly results in higher spatial resolution. For device implementations with lenslet arrays, the reduced angular resolution allows for shorter focal lengths of the employed lenslets resulting in thinner form factors and easier fabrication. For implementations with parallax barriers, pinhole spacings are reduced allowing for increased image brightness.

The optical image formation of a light field on the viewer's retina as well as image inversion methods will now be derived. For this purpose, a two-plane parameterization of the light fields emitted by the device and inside the eye is used. The forward and inverse models in this section are derived for two-dimensional "flatland" light fields with straightforward extensions to the full four-dimensional formulations.

Figure 1:
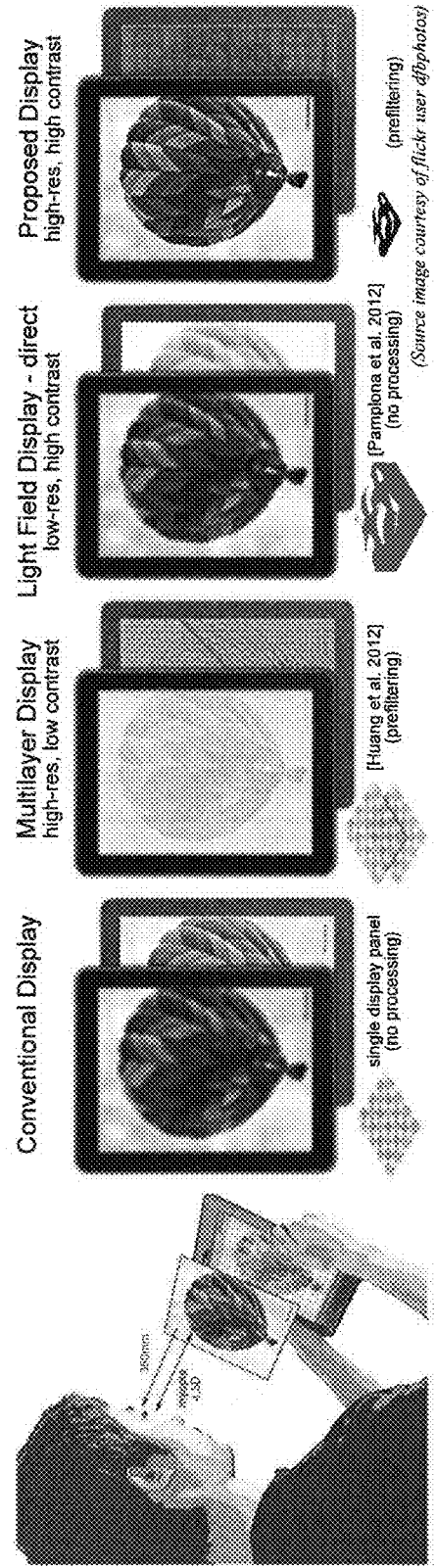
FIG. 1 illustrates vision correction with computational displays, including prior art systems and a system according to an embodiment.
Figure 2:
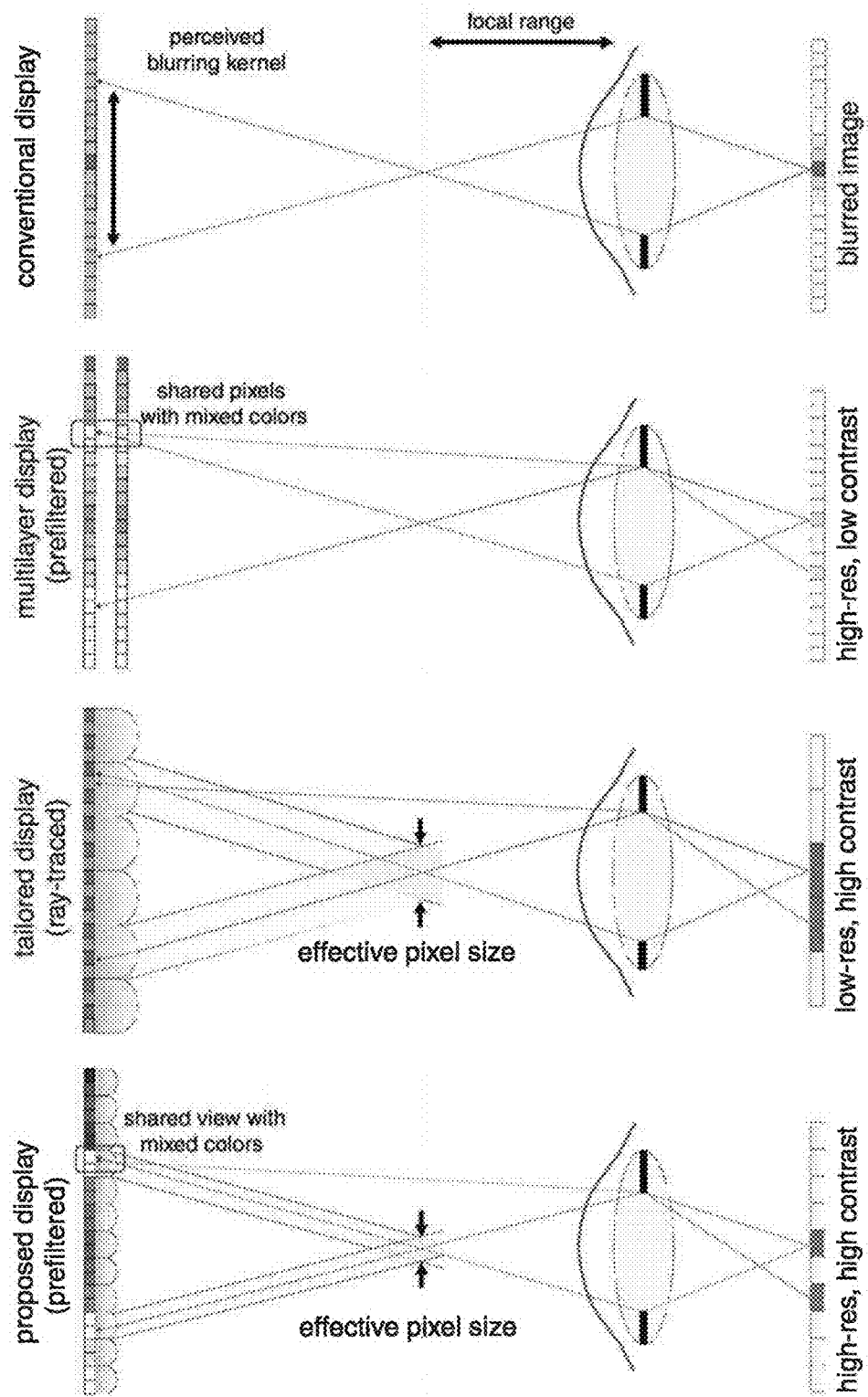
FIG. 2 illustrates operational features of vision displays of FIG. 1.
Figure 3:
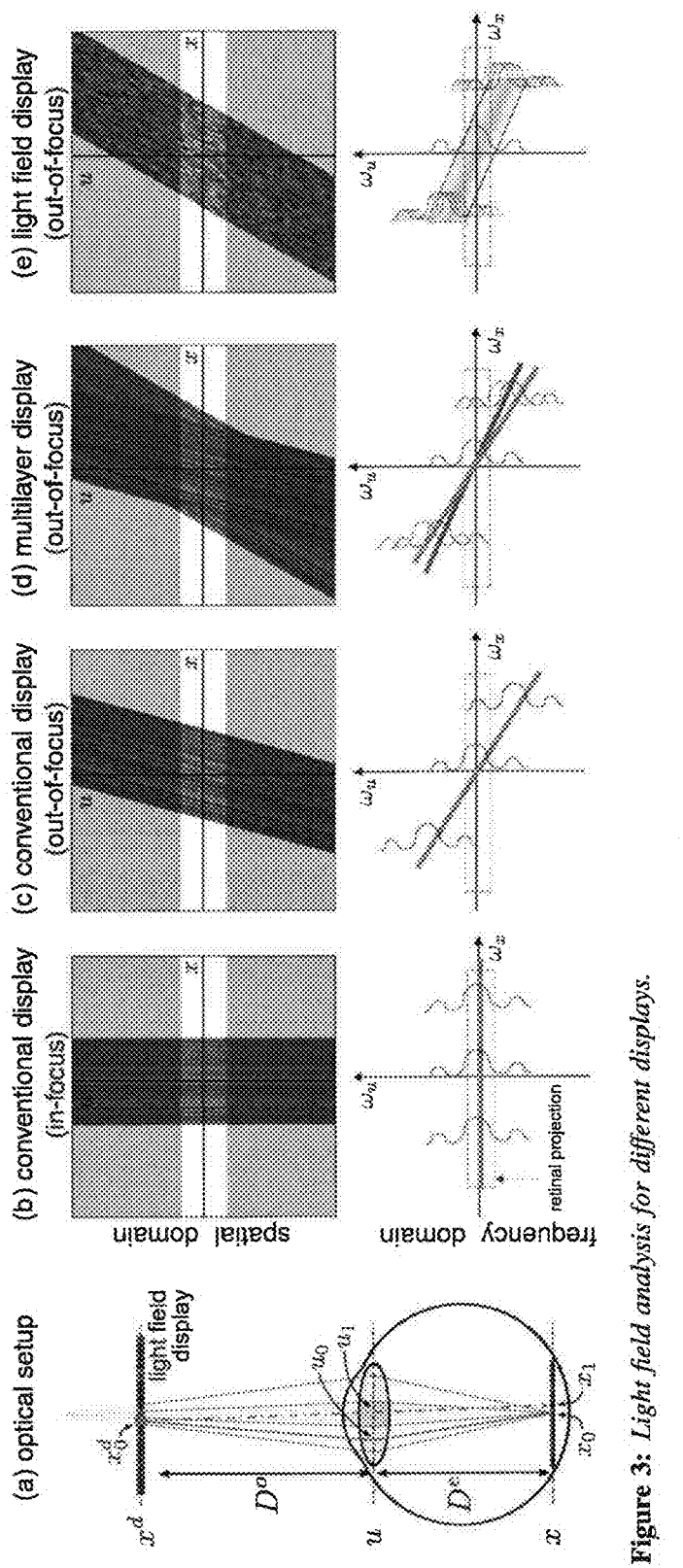
FIG. 3 illustrates light field analysis principles for different displays.

The lateral position on the retina is defined to be x and that on the pupil to be u (see FIG. 3). The light field l (x, u) describes the radiance distribution inside the eye. Photoreceptors in the retina average over radiance incident from all angles; therefore, the perceived intensity i (x) is modeled as the projection of l along its angular dimension:

$$i(x) = \int_{\Omega_u} l(x,u) du, \qquad (1)$$

where $\Omega_u$, may is the integration domain, which is limited by the finite pupil size. Vignetting and other angle dependent effects are absorbed in the light field. Assuming that the display is capable of emitting a light field that contains spatial variation over the screen plane $x^d$ and angular variation over the pupil plane $u^d$, allows one to model the radiance distribution entering the eye as a light field $l^d (x^d, u^d)$. Note that the coordinates on the pupil plane for the light fields inside the eye and on the display are equivalent (u ≙ $u^d$). Refractions and aberrations in the eye are modeled as a mapping function $\emptyset: \mathbb{R} \times \mathbb{R} \to \mathbb{R}$ from the spatio-angular coordinates of l to a location on the screen, such that $x^d = \emptyset(x,u)$. Equation I therefore becomes $$i(x) = \int_{\infty}^{\infty} l^d(\emptyset(x,u),u) A(u) du \qquad (2)$$

Here, the effect of the finite pupil diameter r is a multiplication of the light field with the pupil function $$A(u) = rect\left(\frac{u}{r}\right).$$

In the full 4D case, the rect function is replaced by a circular function modeling the shape of the pupil.

Following standard ray transfer matrix notation, the mapping between rays incident on the retina and those emitted by the screen can be modeled as the combined effect of transport between retina and pupil by distance $D^e$, refraction of the lens with focal length f, and transport between pupil and screen by distance $D^o$. In matrix notation, this transformation is expressed as $$\begin{pmatrix} \emptyset(x,u) \\ u^d \end{pmatrix} = \begin{pmatrix} \frac{D^o}{D^e} & D^o \Delta \\ 0 & 1 \end{pmatrix} \begin{pmatrix} x \\ u \end{pmatrix} = T \begin{pmatrix} x \\ u \end{pmatrix} \qquad (3)$$

Where T is the concatenation of the individual propagation operators and $$\Delta = \frac{1}{D^e} - \frac{1}{f} + \frac{1}{D^o}.$$

As a first-order approximation, Equation 3 only models the defocus of the eye by considering its focal length f, which may be constrained due to the viewer's limited accommodation range. However, astigmatism and higher-order aberrations can be included in this formulation. Discretizing Equations 2 and 3 results in a linear forward model:

$$i = P l^d \qquad (4)$$

where the matrix $P \in \mathbb{R}^{N \times N}$ encodes the projection of the discrete, vectorized 4D light field $l^d \in \mathbb{R}^N$ emitted by the display onto the retina $i \in \mathbb{R}^N$. For the remainder of the disclosure, the number of emitted light rays N is assumed to be the same as the discretized locations on the retina, which makes P square.

The objective of an aberration-correcting display is to present a 4D light field to the viewer, such that a desired 2D retinal projection is perceived. Assuming that viewing distance, pupil size, and other parameters are known, the emitted light field can be found by optimizing the following objective function:

$$\text{Minimize} \quad \|i - Pl^d\|_2 \qquad (5)$$
$$\{l^d\}$$
$$\text{Subject to} \quad 0 \le l_l^d \le 1, \text{ for } l = 1 \ldots N$$

Here, i is the target image (given in normalized power per unit area) and the constraints of the objective account for physically feasible pixel states of the screen. Equation 5 can be solved using standard non-negative linear solvers such as LBFGSB. As shown in the following frequency interpretation and in Equation 5 is an ill-posed problem for conventional 2D displays. The problem becomes invertible through the use of 4D light field displays.

While Equation 5 allows for optimal display pixels states to be determined, a natural question that remains is 'Which display type is best suited for aberration-correction?' This question is answered in two different ways: with a frequency analysis derived in this section and with an analysis of the conditioning of projection matrix P below.

Frequency analyses have become standard tools to generate an intuitive understanding of performance bounds of computational cameras and displays, and this approach is followed in certain embodiments. First. the coordinate transformation T between display and retina can be used to model corresponding transformation in the frequency do-main via the Fourier linear transformation theorem:

$$\begin{pmatrix} w_x^d \\ w_u^d \end{pmatrix} = \begin{pmatrix} -\frac{D^o}{D^e} & 0 \\ D^e \Delta & 1 \end{pmatrix} \begin{pmatrix} w_x \\ w_u \end{pmatrix} = \tilde{T} \begin{pmatrix} w_x \\ w_u \end{pmatrix}, \qquad (6)$$

where $w_x$, $w_u$ are the spatial and angular frequencies of the light field inside the eye, w, w the corresponding frequencies on the display, and $\tilde{T} = T^{-T}$.

One of the interesting results of the frequency analysis is the effect of the pupil outlined in Equation 2. The multiplication with the pupil function in the spatial domain becomes a convolution in the frequency domain whereas the projection along the angular dimension becomes a slicing along $w_u = 0$:

$$\hat{i}(w_x) = (\hat{l} * \hat{A})(w_u, 0) = \int_{\Omega_{\omega_u}} \hat{l}(\omega_x, \omega_n) \hat{A}(\omega_x) d\omega_u \qquad (7)$$
$$= \int_{\Omega_{\omega_u}} \hat{l}^d\left(-\frac{D^e}{D^o}\omega_x, D^3\Delta\omega_x + \omega_u\right) \hat{A}(\omega_u) d\omega_x.$$

Here, ^ denotes the Fourier transform of a variable and $\hat{A} = \text{sinc}(r\omega_u)$. Note that the convolution with the sinc function accumulates higher angular frequencies along $\omega_u = 0$ before the slicing occurs, so those frequencies are generally preserved but are all mixed together (see FIGS. 3 b-e).

Equation 7 is the most general formulation for the perceived spectrum of an emitted light field. The light field that can actually be emitted by certain types of displays, however, may be very restricted. In a conventional 2D display, for instance, each pixel emits light isotropically in all directions, which makes the emitted light field constant in angle. Its Fourier transform is therefore a Dirac in the frequencies (i.e. $\hat{l}^d(\omega_x^d, \omega_u^d) = 0 \forall \omega_u^d \ne 0$).

Taking a closer look at Equation 7 with this restriction in mind, allows one to disregard all non-zero angular frequencies of the displayed light field and focus on $\omega_u^d = D^e \Delta \omega_x^+ \omega_u = 0$. As illustrated in FIGS. 3 (b-e, bottom), the light field incident on the retina is therefore a line $\omega_u = -D_e \Delta \omega_x$, which can be parameterized by its slope $s = -D^e \Delta$. Equation 7 simplifies to:

$$\hat{i}_{2D}(\omega_x) = \hat{l}^d\left(-\frac{D^e}{D^o}\omega_x, 0\right) \text{sinc}(r s \omega_x). \qquad (8)$$

Unfortunately, sinc functions contain a lot of zero-valued positions, making the correction of visual aberrations with 2D displays an ill-posed problem.

Huang et al. [2012] proposed to remedy this ill-posedness by adding an additional layer, such as a liquid crystal display, to the device. Although stacks of liquid crystal panels usually result in a multiplicative image formation, Huang et al. [2012] proposed to multiplex the displayed patterns in time, which results in an additive image formation because of perceptual averaging via persistence of vision. As illustrated in FIG. 3 (d), this changes the frequency domain representation to the sum of two lines with different slopes. Generalizing Equation 8 to multiple display layers results in the following frequency representation of the retinal projection:

$$\hat{i}_{ml}(\omega_x) = \sum_k l^{(d,k)}\left(-\frac{D^e}{D^{(o,i)}}\omega_u, 0\right)\text{sinc}(rs^{(k)}\omega_x), \quad (9)$$

where $a^{(k)}$l is the slope of display layer k and $i^{(d,k)}$ is the light field emitted by that layer. The offsets between display layers are chosen so that the envelope of the differently sheared sinc functions contains no zeros. While this is conceptually effective, physical constraints of the display, such as nonnegative pixel states and limited dynamic range, result in a severe loss of contrast in practice.

As opposed to 2D displays or multilayer displays, light field displays have the capability to generate a continuous range of spatio-angular frequencies. Basically, this allows for multiple virtual 2D layers to be emitted simultaneously, each having a different slope s (see FIG. 3e). Following the intuition used in Equations 8 and 9, Equation 7 can be written as $$\hat{i}_{lf}(\omega_x) = \int_{\Omega_b} l(w_x, k\omega_x) \dot{A}(\dot{s}\omega_x) d\dot{s} \quad (10)$$

$$= \int_{\Omega_b} l^d\left(-\frac{D^e}{D^o}\omega_u, D^e\Delta\omega_x + \bar{s}\omega_x\right)\text{sinc}(r\bar{s}\omega_x) d\bar{s}$$

Although Equation 10 demonstrates that light field displays support a wide range of frequencies, many different solutions for actually computing them for a target image exist. Pamplona et al. [2012] chose a naive ray-traced solution. Light field displays, however, offer significantly more degrees of freedom, but these are only un-locked by solving the full inverse light field projection problem (Eq. 5), which is called "light field prefiltering". This approach provides significant improvements in image resolution and contrast as is shown below.

Figure 4:
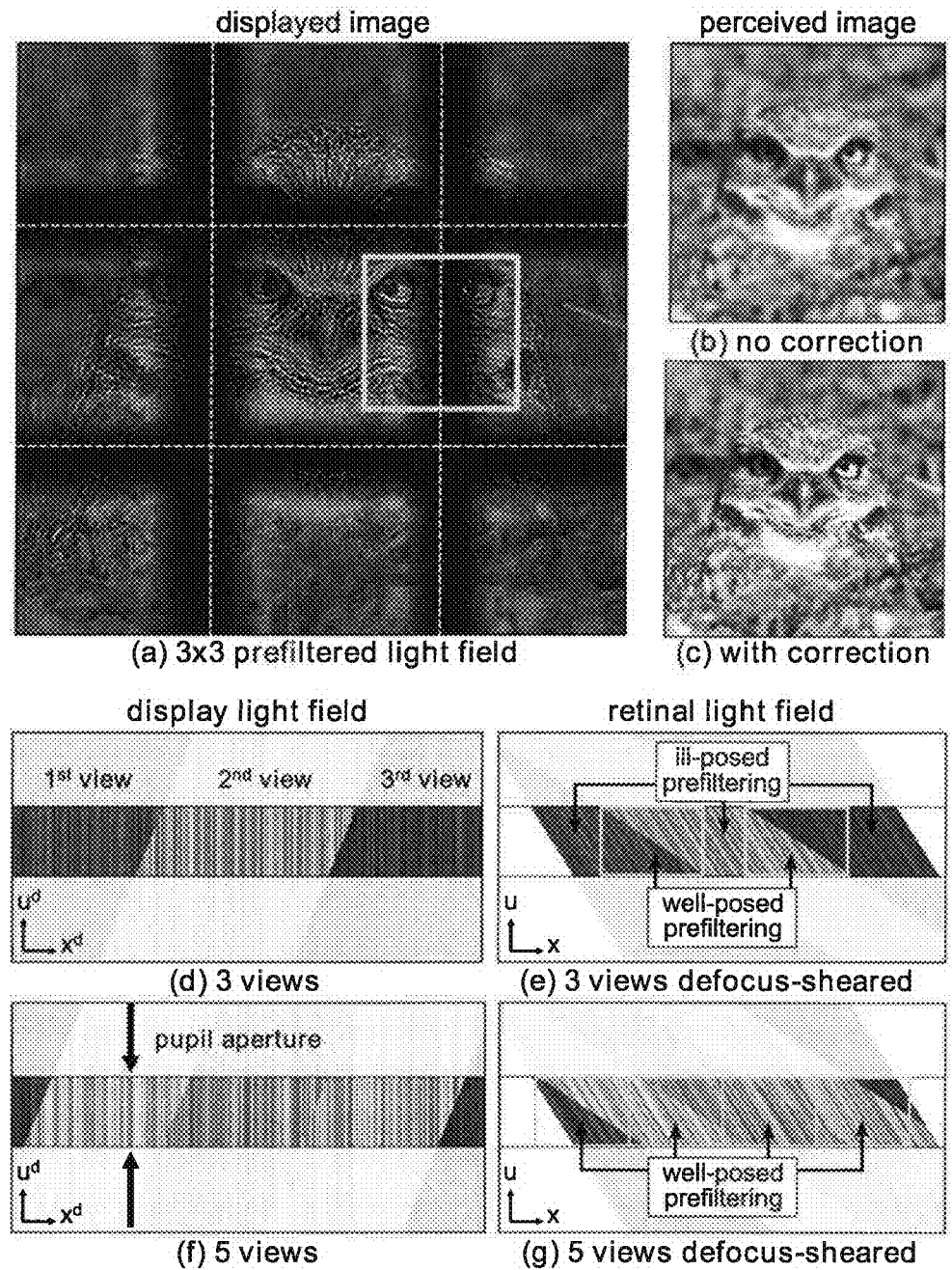
FIG. 4 shows an example of a prefiltered light field with 3×3 views for a sample scene according to an embodiment

FIG. 4 (a) show an example of a prefiltered light field with 3×3 views for a sample scene according to an embodiment. In this example, the different views contain overlapping parts of the target image (yellow box), allowing for increased degrees of freedom for aberration compensation. Precisely these degrees of freedom are what makes the problem of correcting visual aberration well-posed. The 4D prefiltering does not act on a 2D image, as is the case for conventional displays, but lifts the problem into a higher-dimensional space in which it becomes invertible. Although the prefiltered light field (FIG. 4, a) appears to contain amplified high frequencies in each view of the light field, the prefilter actually acts on all four dimensions simultaneously. When optically projected onto the retina of a viewer, all light field views are averaged, resulting in a perceived image that has significantly improved sharpness (c) as compared to an image observed on a conventional 2D display (b).

This principle is illustrated using an intuitive 2D light field in FIGS. 4 (d-g). The device emits a light field with three (d,e) and five (f,g) views, respectively. Individual views are shown in different colors. These are sheared in display space (d,f), because the eye is not actually focused on the display due to the constrained accommodation range of the viewer. The finite pupil size of the eye limits the light field entering the eye, as illustrated by the semi-transparent white regions. Whereas the light fields are shown in both display coordinates (d,f) and eye coordinates (e,g), the latter is more intuitive for understanding when vision correction is possible. For locations on the retina that receive contributions from multiple different views of the light field (indicated by yellow boxes in e,g), the inverse problem is well-posed. Regions on the retina that only receive contributions from a single light field view, however, are optically equivalent to the conventional 2D display case, which is ill-posed for vision correction.

Figure 5:
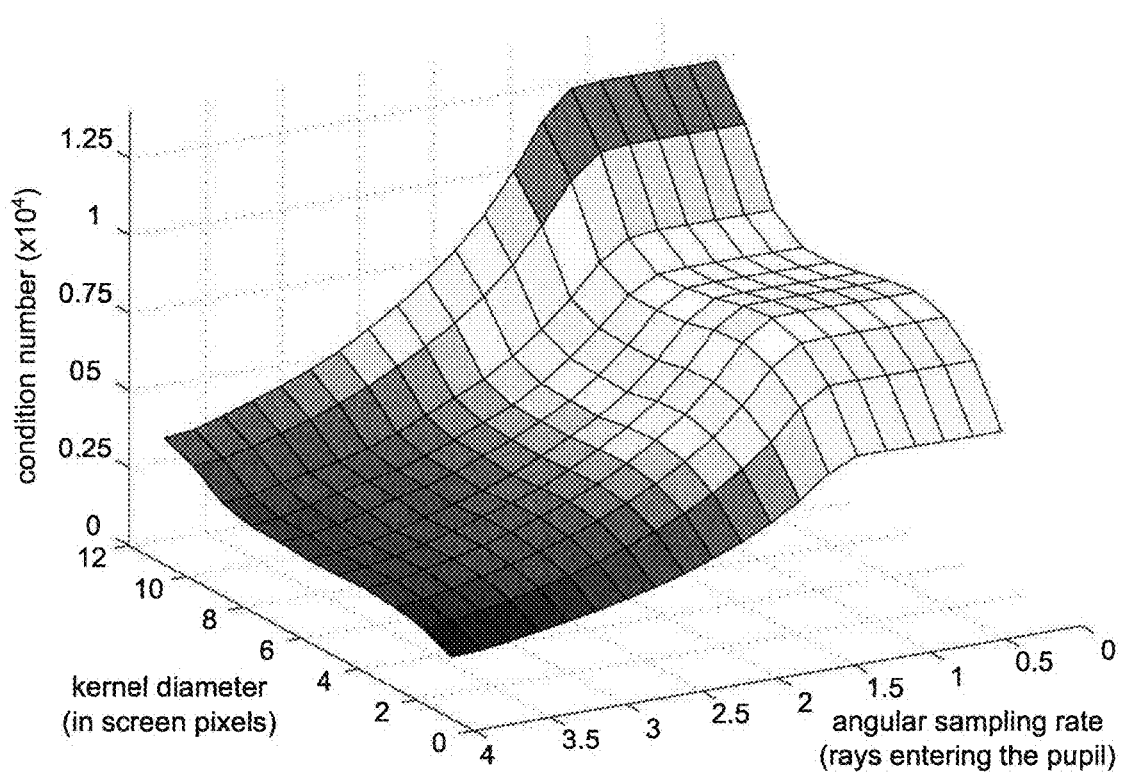
FIG. 5 illustrates a conditioning analysis graph.

To formally verify the discussed intuition, the condition number of the light field projection matrix P (see Eqs. 4, 5) is analyzed. FIG. 5 shows the matrix conditioning for varying amounts of defocus and angular light field resolution (lower condition number is better). Increasing the angular resolution of the light field passing through the viewer's pupil significantly decreases the condition number of the projection matrix for all amounts of defocus. This results in an interesting observation: increasing the amount of defocus increases the condition number but increasing the angular sampling rate does the opposite. Note that the amount of defocus is quantified by the size of a blur kernel on the screen (see FIG. 5).

The condition number drops significantly after it passes the 1.3 mark, where the angular sampling enables more than one light field view to enter the pupil. This effectively allows for angular light field variation to be exploited in the prefiltering. As more than two light field views pass through the pupil, the condition number keeps decreasing but at a much slower rate. With an extreme around 7 to 9 views, each ray hits exactly one retinal pixel, but the spatial-angular trade-off reduces the image resolution. The light field prefiltering method according to one embodiment is located in between these two extremes of choosing either high resolution or high contrast, but not both simultaneously. Usually, less than two views are required to maintain a sufficiently low condition number. The experiments in FIG. 5 are computed with a viewing distance of 350 mm, a pupil diameter of 6 mm, and a pixel pitch of 45 μm. The angular sampling rate refers to the number of light field views entering the pupil.

Figure 6:
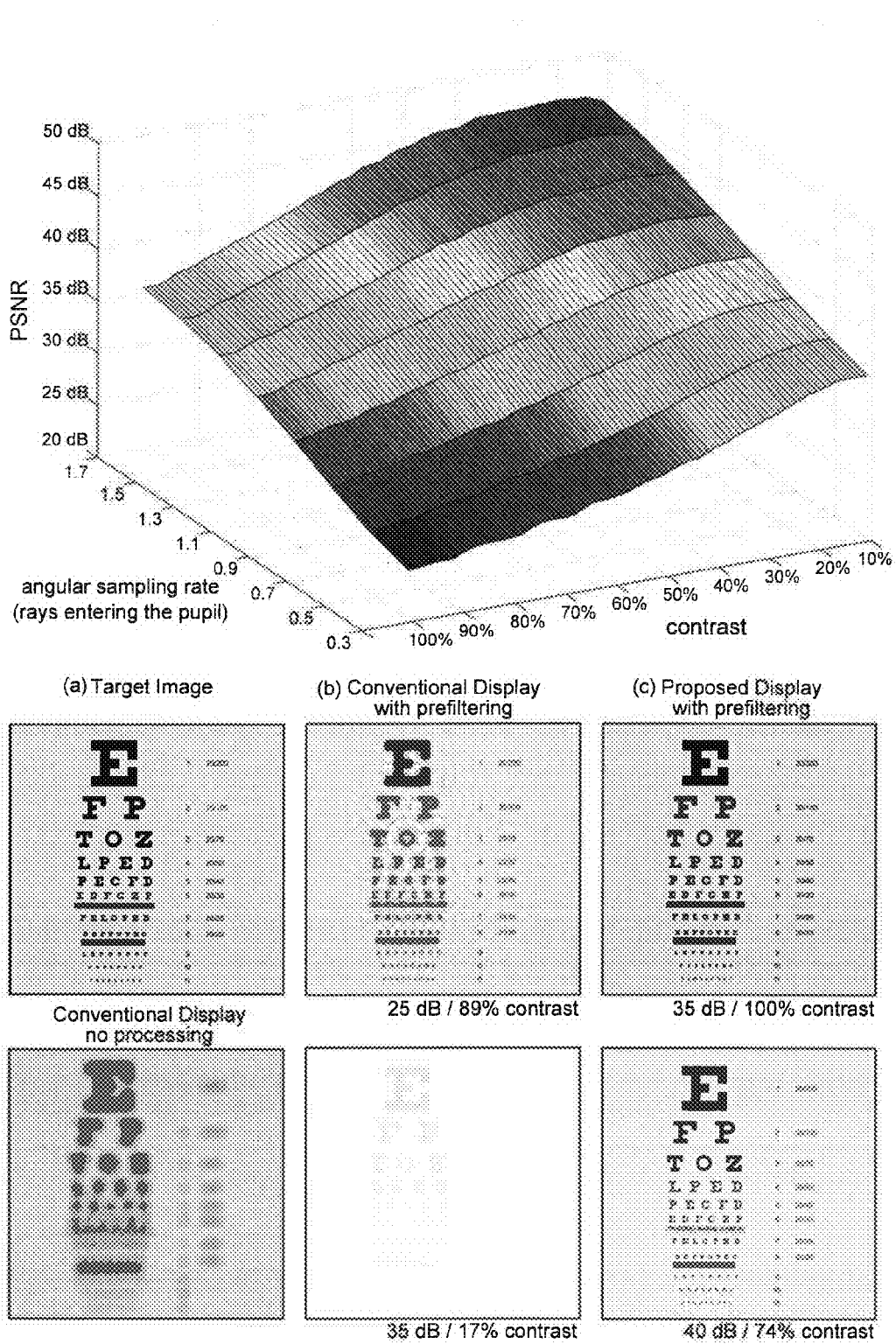
FIG. 6 illustrates the tradeoff between angular light field resolution and image contrast.

At the defocus level shown in FIG. 6 (a, bottom), naively applying the nonnegative constraint in Equation 5 results in additional artifacts as shown in (b, top). Alternatively, one can shift and scale the target image before solving the system, effectively scaling the target image into the range space of the projection matrix. Although this is a user-defined process, observed image quality can be enhanced. In particular, Equation 5 can be modified as $$\text{Minimize} \quad \|(i+b)/(1+b) - Pl^d\|_2 \quad (11)$$
$$\{l^d\}$$

-continued

Subject to $0 \le l_i^q \le 1$, for $I = 1 \ldots N$ where b is a user specified bias term that reduces the image contrast to I/(b+1).

Achieved image quality measured in PSNR is plotted for all contrast levels at various angular sampling rates in FIG. 6 (top). With a conventional display, prefiltering results in ringing artifacts (b) because the inverse problem is ill-conditioned. Artificially reducing the image contrast mitigates the artifacts but makes the text illegible (b. bottom). A light field display makes the inverse problem well-posed, allowing for high quality prefiltering (c). The pixel pitch of the experiment shown in FIG. 6 is 96 µm; other parameters are the same as in FIG. 5. The contrast bias term b may require manual tuning for each experiment.

In certain embodiments, display systems that incorporate vision-correcting technologies will use eye tracking. In such devices, the projection matrix (see Eq. 4) is dynamically updated for the perspective of the viewer. In certain embodiments, eye-tracking is not needed because the relative position between the eye and display is fixed. In certain embodiments, herein, it may be assumed that eye tracking is either available or the relative position between display and eye is fixed.

Figure 7:
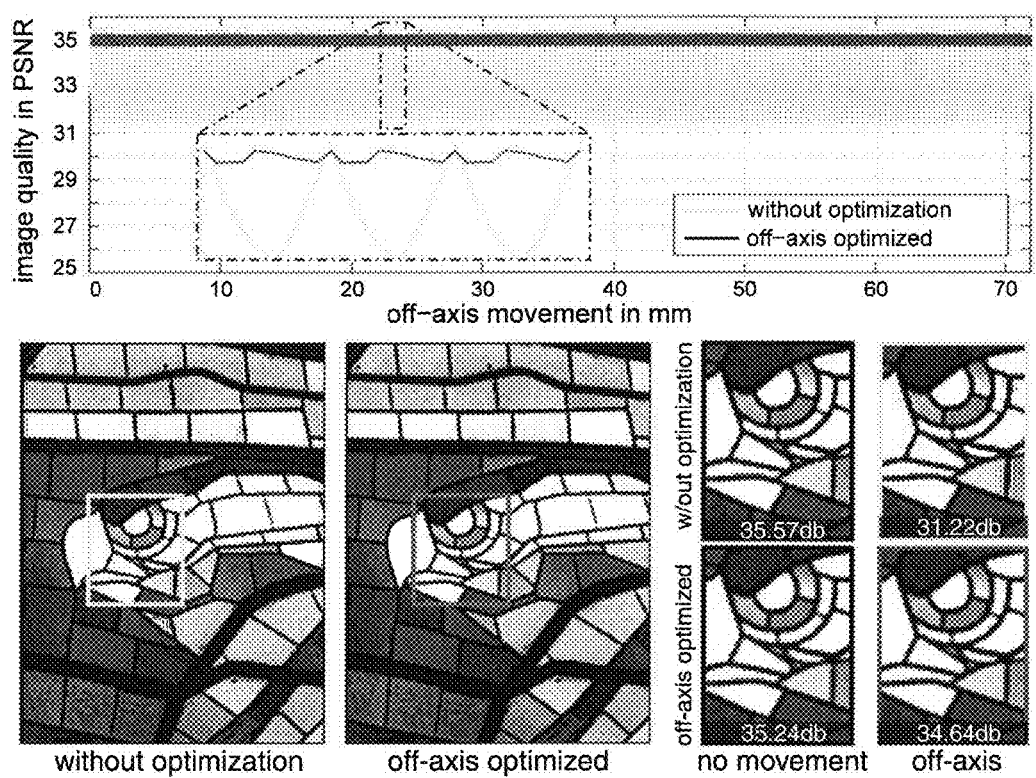
FIG. 7 illustrates compensating for a range of lateral viewpoints.

Nevertheless, image degradation is evaluated for viewpoints that are at a lateral distance from the target viewpoint in FIG. 7. Such shifts could be caused by imprecise tracking or quickly moving viewers. Slight image degradation in the form of ringing is observed. However, even the degraded image quality is above 30 dB in this experiment and varies in a periodic manner (FIG. 7, top: zoom-in). This effect can be explained by the periodic viewing zones that are created by the employed parallax barrier display; a similar effect would occur for a light field display using a lenslet array. A range of lateral viewpoints may be accounted for by changing the matrix in Equation 11 to $P=[P_{T1}, \ldots, P_{TM}]^T$ where each $P_{T1}$, is the projection matrix of one of M perspectives. Although this approach slightly degrades image quality for the central "sweetspot," a high image quality (approximately 35 dB) is achieved for a much wider range of viewpoints. The lateral range tested in FIG. 7 is large enough to demonstrate successful aberration-correction for binocular vision, assuming that the inter-ocular distance is approx. 65 mm.

Figure 8:
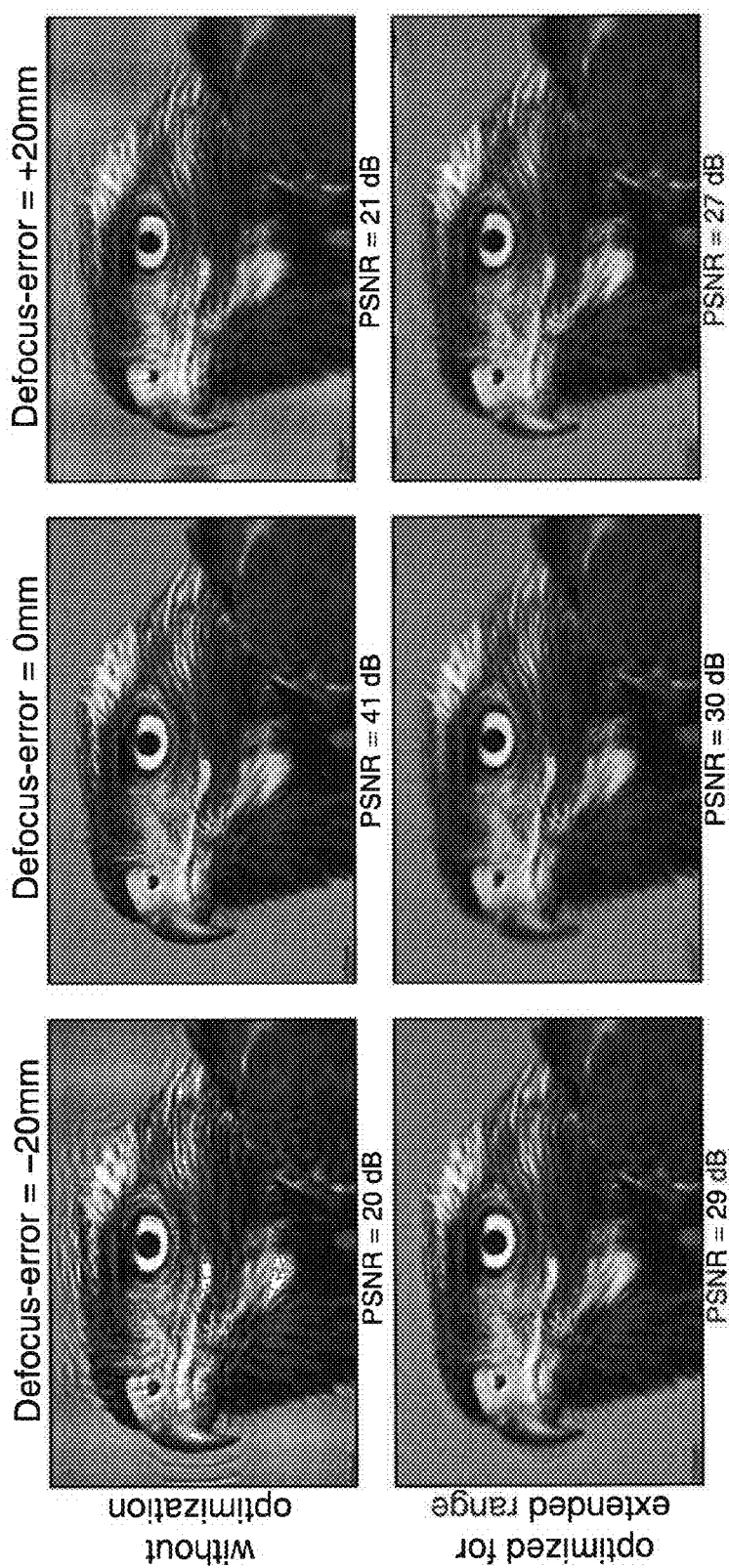
FIG. 8 illustrates accounting for a range of viewing distances.

Results for a viewer moving along the optical axis is shown in FIG. 8. Just like for lateral motion, variable distances can be accounted for by stacking multiple light field projection matrices into Equation 11 with incremental defocus distances. The resulting equation system becomes over-constrained, so the solution attempts to satisfy all viewing distances equally well. This results in slight image degradations for the sweetspot, but significantly improves image quality for all other viewing distances.

An aberration-correcting display according to certain embodiments can be implemented using a variety light field display technologies. One example is a parallax barrier display, which is advantageous because the required hardware is readily available and inexpensive. Other examples include elements comprising lenses. Examples include microlens arrays, lenslet arrays, lenticular arrays, lenticular lenses, lenticular screens, etc. The display embodiments herein are not limited to any particular architecture, although the image formation (Eq. 4) may need to be adjusted for any particular setup.

Figure 9:
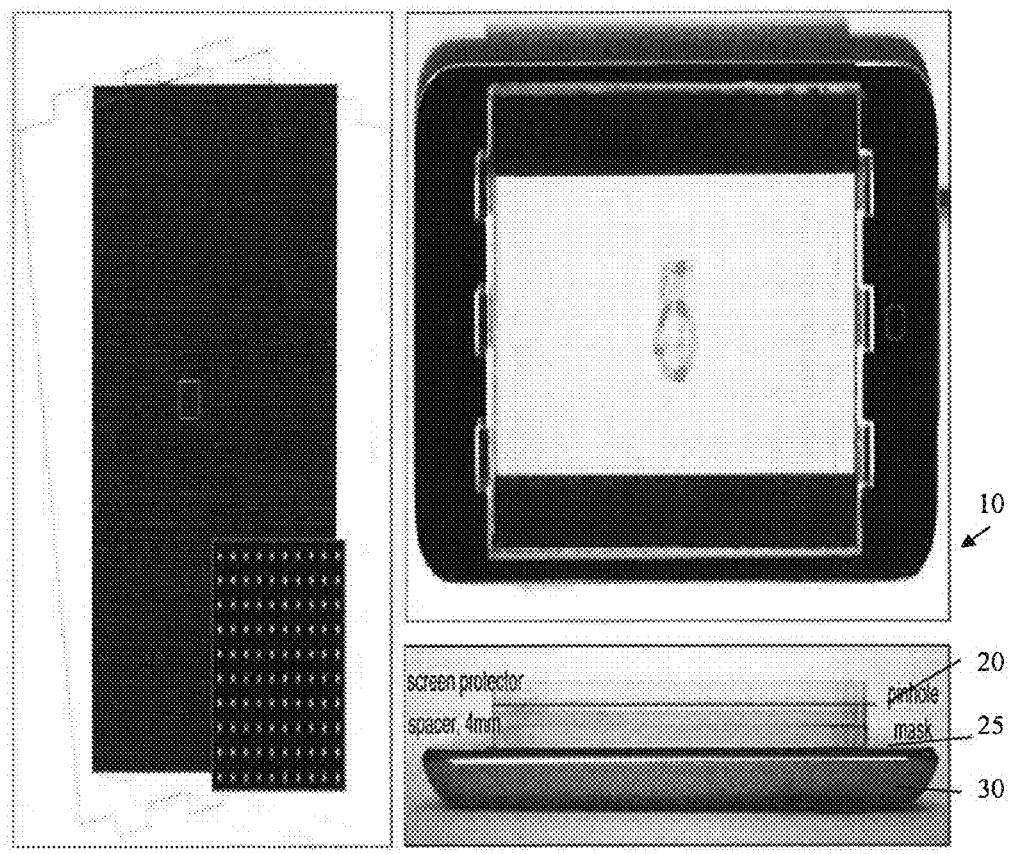
FIG. 9 illustrates a display device according to an embodiment.

FIG. 9 shows an aberration-correction display device 10 according to an embodiment. The display device compensates for at least one optical aberration in a vision system of a viewer viewing the display 25. The display device 10 includes a display medium 25 including an array of visual display elements or pixels, a light field element 20, and a processor element 30. The processor element 30 processes image data for an image to be displayed. The image data includes pixel values for each pixel to be rendered. The image data may be received from a remote device, e.g., wirelessly, or the image data may be retrieved from a memory (not shown) of the device or the image may be acquired by the device, e.g., in real-time. For example, a camera on the device may acquire an image or a plurality of images in real time and use the images in real time and/or store the image(s) to memory for later use. The processor element 30 may include one or more microprocessors, or a specialized microprocessor or processing unit such as an ASIC. The processing element may be implemented in a GPU as an example. The memory, which may be a non-transient or non-transitory, computer-readable storage medium, is configured to store information within device 10 during operation. In certain embodiments, the memory includes both volatile and non-volatile memory, where the non-volatile memory maintains its contents when device 10 is turned off. Examples of such non-volatile memory include flash memory, read only memories (ROM), electrically erasable programmable read-only memory (EEPROM), resistive random access memory (RRAM), etc. Examples of volatile memories that lose their contents when device 10 is turned off include random access memories (RAM), dynamic random access memories (DRAM), and static random access memories (SRAM). The memory also maintains program instructions for execution by the processing element, including instructions for implementing the aberration compensation processes and prefiltering processes described herein.

The processing element computes, using the image to be displayed, an aberration compensated image as described herein based on at least one input parameter related to the at least one optical aberration in the vision system of the viewer and on at least one characteristic of the light field element. The optical aberration may be a lower order aberration or a higher order aberration, and the parameter may include a focal length, f, of the viewers eyes. The characteristic of the light field element may include an offset distance between the light field element 20 and the display medium 25 (e.g., the depth of the spacer, as an example). The processing element 30 then renders the aberration compensated image on the display medium, such that when viewed through the light field element, the aberration compensated image displayed on the display medium appears to the viewer with said at least one aberration reduced or eliminated so as to compensate for the at least one optical aberration in the vision system of the viewer. In certain embodiments, the processing element may be remote from the display device, e.g., computations are performed and prefiltered data and/or aberration compensated images are provided to the display system remotely from the processing element that performs the computations and prefiltering processes.

In one embodiment, the light field element 20 includes a parallax barrier mask element, which includes a pinhole array (e.g., left in FIG. 9) that is mounted at a slight offset in front of a display screen (e.g., an Apple iPod touch 4 screen as shown in lower right with a pixel pitch of 78 microns (326 PPI) and a total resolution of 960×640 pixels).

The display emits a light field with an angular resolution sufficient so that at least two views enter the pupil of a human viewer. This effect is illustrated on the top right of FIG. 9: multiple Arabic numerals are emitted in different viewing directions; the finite pupil size then creates an average of multiple different views on the retina (here simulated with a camera).

The pinhole parallax barrier mask may be printed, e.g., with desired DPI such as 5080 DPI, on a transparent material layer, e.g. with a Heidelberg Herkules imagesetter. To optimize light throughput and avoid diffraction, the pinholes in one embodiment have a size of about 75 microns each and are spaced about 390 microns apart. This mask is mounted at an offset, e.g., of 5.4 mm, in front of a conventional 2D screen using a clear acrylic spacer. The offset may of course vary as desired. The display has a pixel pitch of 78 microns (326 PPI) and a total resolution of 960×640 pixels. The dimensions allow 1.66 light field views to enter a human pupil with a diameter of 6 mm at a distance of 25 cm. Higher-resolution panels are commercially available and would directly improve spatial and angular resolution and also facilitate larger viewing distances.

In other embodiments, the light field element 20 may include a plurality of lens elements, including for example, a microlens array, a lenslet array, a lenticular array, a lenticular lens, a lenticular screen, etc. The lens elements may be arranged in a rectangular grid pattern, or they may be arranged in a non-rectangular pattern. In one embodiment, for example, the lens elements are arranged in a honey-comb pattern.

An optional screen protector, e.g., as shown in FIG. 9, may be provided in certain embodiments.

The light field prefiltering algorithm is implemented in the processing element. As an example, a prefiltering algorithm was implemented in Matlab on a PC with a 2.7 GHz 2-core CPU and 8 GB of RAM. The projection matrix was precomputed with radiances sampling the pupil at 20 rays/mm, resulting in approximately 11,300 effective rays per retinal pixel. A non-negative least squares solver package LBFGSB was used to solve equation 11 for each image shown on the prototype. The projection matrix need only be computed once for each viewing distance and an optimized CPU/GPU implementation of the solver could achieve real-time framerates.

Figure 10:
FIG. 10 illustrates example photographs of displays according to an embodiment.

A variety of results captured from a prototype display are shown in FIG. 10 (center right column). These photographs are captured with a DSLR camera equipped with a 50 mm lens at f18. The display is placed at a distance of 25 cm to the camera. The camera is focused at 38 cm, placing the screen 13 cm away from the focal plane. This camera closely resembles a −60 hyperopic human eye.

FIG. 10 (right column) shows the simulated results corrected with techniques of the present embodiments. The results captured from the particular embodiment (FIG. 10, third column) closely resemble these simulations but contain minor artifacts that are due to moiré between the barrier mask and the display pixels. Compared to conventional 2D images shown on the screen (FIG. 10, first column), image sharpness is significantly improved without requiring the viewer to wear glasses. The present embodiments are compared with the method proposed by Pamplona et al. [2012] for the same display resolution and spatio-angular trade-off (FIG. 10, second column). As can be seen, the present approach outperforms the prior method and allows for significantly increased resolution.

Figure 11:
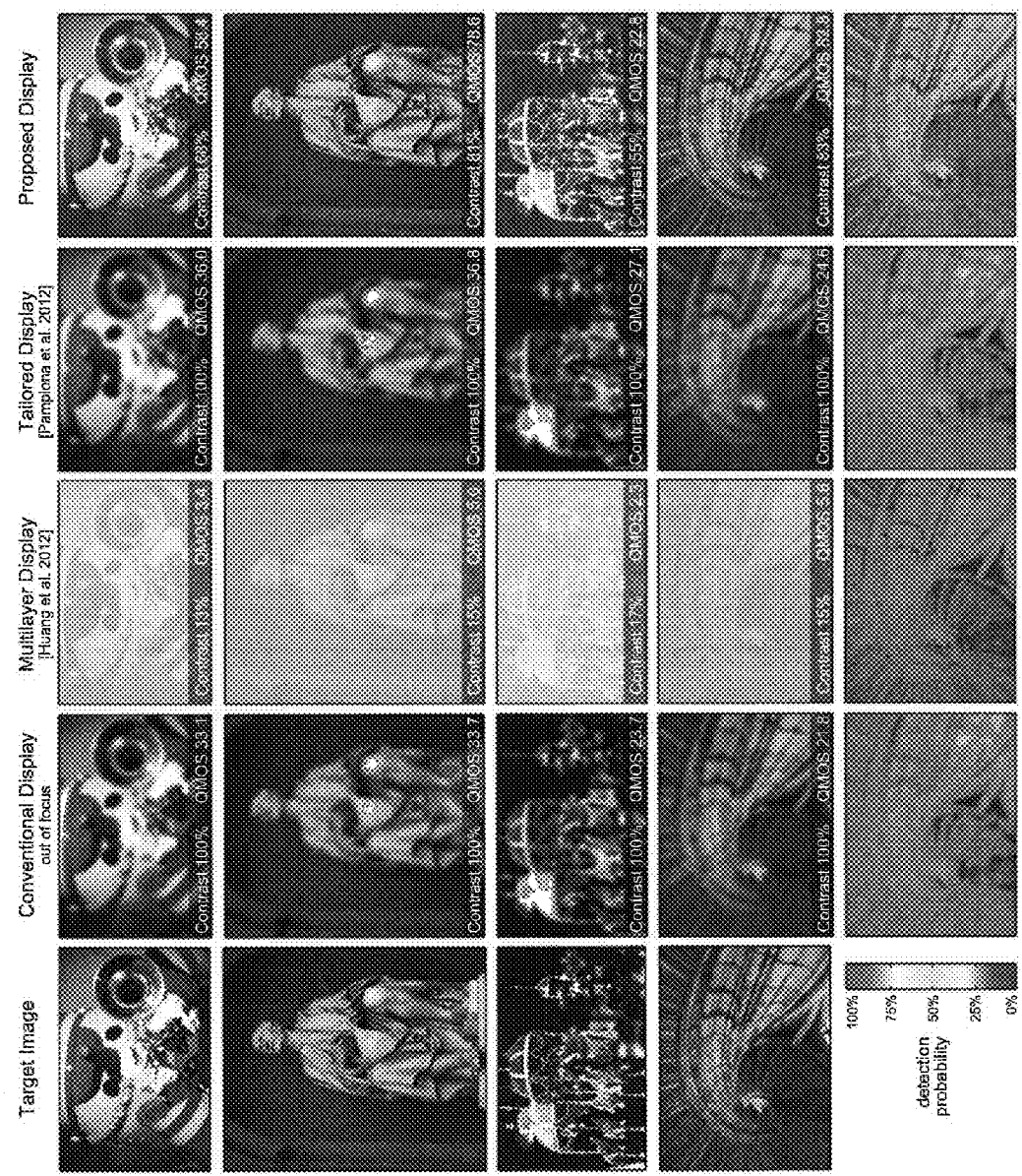
FIG. 11 illustrates evaluation and comparison of images rendered by an embodiment to previous work.

Achieved quality is evaluated in FIG. 11. For this experiment, a 10-inch tablet with a 300 PPI panel and a pinhole parallax barrier with 6.5 mm offset is simulated. The tablet is held at a distance of 30 cm and viewed with a −6.75 D hyperopic eye; images are shown on the center of the display in a 10.8 cm×10.8 cm area. For each example, the present approach is compared with the direct light field approach and multilayer prefiltering. The target contrast for prefiltering methods is manually adjusted to achieve the best PSNR for each example.

Prefiltering involves modulating the image content by enhancing weaker frequencies. Without utilizing the full degree of freedom in the light field sense, the results obtained using multilayer prefiltering suffer from extreme contrast loss, here measured in Michelson contrast. This is defined as $(I_{max}-I_{min})(I_{max}-I_{min})$, where $I_{max,min}$ are the maximum and minimum intensity in the image, respectively. Light field predistortion does not depend on content modifications but on resampling of the light field. so the contrast is not sacrificed. By efficiently using all views, the light field prefiltering approach of the present embodiments restores contrast by a factor of 3 to 5× higher than that of the multilayer pre-filtering. The contrast achieved with lightfield prefiltering is not quite as good as the raytracing algorithm, which always gives full contrast. However, when closely inspecting the image content, the raytracing solution always results in blurred images, which is due to insufficient spatial resolution.

To assess both contrast and sharpness, we resort to HDR-VDP2, a perceptually-based image metric. The quality mean opinion score (QMOS) gives an evaluation of overall perceived image quality, and in most examples a score of 2 to 3 times higher than other approaches is achieved. The images in the third row are a particularly difficult example for prefiltering-based algorithms, because performance depends on the frequency content of the image which, in this case, does not allow prefiltering to achieve a higher quality. Lots of high frequencies in the example tend to reduce image contrast so that even the light field prefiltering scores slightly lower. Visually, the result still looks sharp. In the last row of Figure II, a probabilistic map on whether a human can detect per pixel differences for the fourth example is shown. Clearly, the result has a much lower detection rate.

Note that the reduced image sharpness of conventional displays (FIG. 11, column 2) is due to defocus blur in the eye, whereas that of Tailored Displays (FIG. 11, column 4) is due to the low spatial resolution or the light field display. All displays in this simulation have the same pixel count, but the microlens array used in Tailored Displays trades spatial display resolution for angular resolution.

Although aberrations of human eyes are usually dominated by myopia and hyperopia, astigmatism and higher-order aberrations may also degrade observed image quality. Visual distortions of a perceived wavefront are usually described by a series of basis functions known as Zernike polynomials. These are closely related to spherical harmonics, which are commonly used in computer graphics applications. Lower-order Zernike polynomials include defocus and astigmatism whereas higher-order terms include coma, trefoil, spherical aberrations, and many others. The effects of any such terms can easily be incorporated into the image inversion described above by modifying the projection matrix P.

Figure 12:
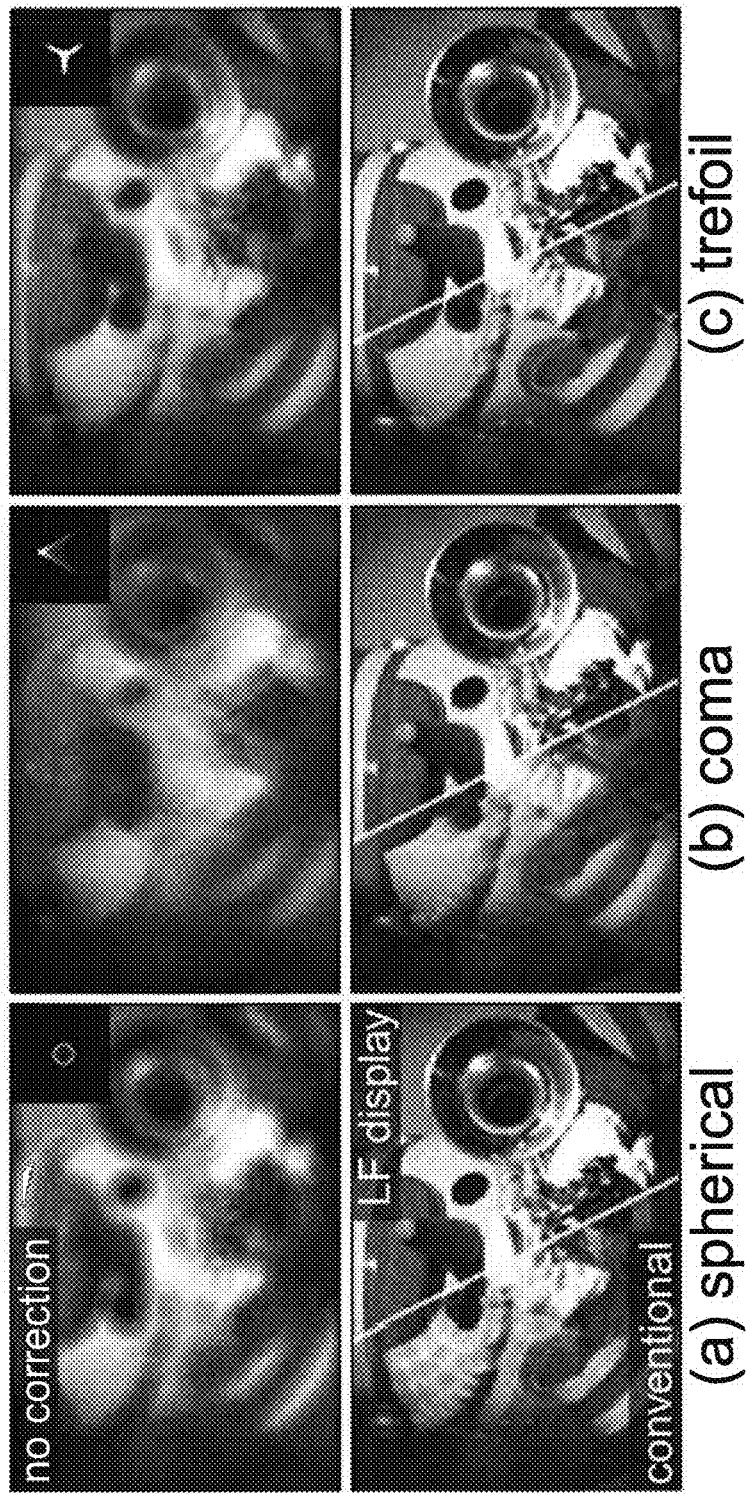
FIG. 12 illustrates correcting for higher-order aberrations.

FIG. 12 evaluates compensation of higher-order aberrations with an approach of an embodiment. The top row shows the images a viewer with these aberrations perceives without correction. Just as in the case of defocus, prefiltering for a conventional display usually rails to achieve high image quality (bottom row, lower left image parts). Ringing artifacts that are typical for solving ill-posed de-convolution problems are observed. The present aberration-correcting display, on the other hand, successfully compensates for all types of aberrations (bottom row, upper right parts). What is particularly interesting to observe in this experiment is that some types of higher-order aberration can be reasonably well compensated with a conventional display. As seen in the right column of FIG. 12 (bottom row, lower left part), the point spread function of trefoil, for example, is frequency preserving and therefore easy to invert. For most other types of aberrations, however, this is not the case.

The present embodiments are capable of a wide range of possible implementations on devices such as phones, tablets, televisions, and head-worn displays. In this paper, we demonstrate one particular implementation using a low-cost hardware add-on to a conventional phone. In a commercial setting, this could be implemented using switchable liquid crystal barriers, similar to those used by Nintendo 3DS, which would allow the display to dynamically adapt to different viewers or viewing conditions.

In certain embodiments, the precise location of the viewer's eye with respect to the screen is either fixed or tracked. Inexpensive eye trackers are commercially available today (e.g., http://theeytribe.com) and are useful for larger-scale vision-correcting displays; hand-held devices could use integrated cameras.

The disclosed techniques offer significantly increased resolution and contrast compared to prior vision-correcting displays. Intuitively, light field prefiltering minimizes demands on angular light field resolution, which directly results in higher spatial resolution. For device implementations with lenslet arrays, the reduced angular resolution, allows for shorter focal lengths of the employed lenslets resulting in thinner form factors and easier fabrication. For implementations with parallax barriers, pinhole spacings are reduced allowing for increased image brightness.

Lenslet arrays and parallax barriers are treated herein as similar optical elements throughout. In practice, however, the image formation of each is slightly different and the implementation of Equation 4 may need slight adjustment for each case as would be readily apparent to one skilled in the art.

Figure 13:
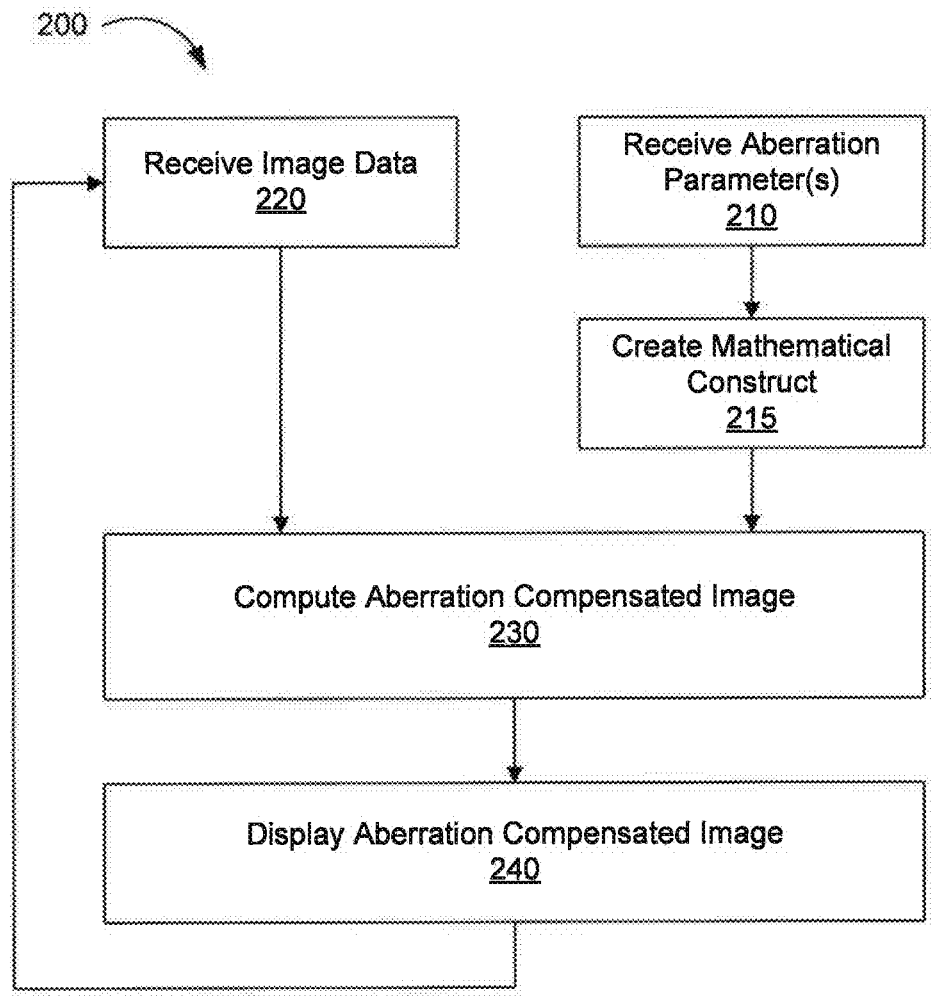
FIG. 13 illustrates a method of compensating for at least one optical aberration in a vision system of a viewer who is viewing a display according to an embodiment.

FIG. 13 illustrates a method 200 of compensating for at least one optical aberration in a vision system of a viewer who is viewing a display. The method is typically implemented in a display device or system including a display medium and a light field element positioned proximal to the display medium. The display medium includes an array of pixel elements. In step 210, at least one parameter related to at least one optical aberration in the vision system of the viewer is received. The parameter may be a parameter of a lower order aberration or a higher order aberration and may be received as input from a user, e.g., using a user interface device of the system, or it may be received or retrieved from a separate system, e.g., from a remote computer system. For example, in certain aspects, the parameter(s) could be supplied by a prescription from an eye care clinician (including, but not limited to, an optometrist (O.D.), ophthalmologist (M.D), or optician) or from an instrument (including, but not limited to, aberrometer or autorefractor) Examples of parameters that may be used include eyeglass prescription values or parameters, e.g., spherical correction, cylindrical correction and axis, often denoted SPH, CYL, and AXIS, respectively. Another possible parameter may include the focal length, f, of the user's/viewer's eyes, or a function of the focal length, f(f). In step 215, the aberration parameter(s) are used to create a mathematical construct that is independent of any image to be processed. The mathematical construct may be stored to memory.

In step 220, image data for an image to be displayed is received. The image data may be received or accessed/ retrieved from a device memory, or acquired in real-time, e.g., from a camera, or received remotely, e.g., wirelessly or through a wired connection with the processing element. The image data includes pixel values for each pixel to be displayed.

In step 230, an aberration compensated image to be displayed is computed. The aberration compensated image is computed using the image data and the mathematical construct, e.g., based on the at least one received parameter related to the vision system of a viewer and on at least one characteristic of the light field element. For example, the characteristic may be an offset distance between the light field element and the display screen, and/or it may be a pitch between individual elements (e.g., lenses or pinholes) of the light field element, and/or it may include other relevant dimensions of the various device components. The aberration compensated image may optionally be stored to memory. In step 240, the aberration compensated image is displayed or rendered on the display medium. Advantageously, when viewed through the light field element, the aberration compensated image displayed on the display medium appears to the viewer with the at least one optical aberration reduced or eliminated. In this manner, the method advantageously compensates for the at least one optical aberration in the vision system of the viewer.

In certain embodiments, for example for dynamic and/or changing images (e.g., video), computations based on the aberration parameter(s) are performed once in step 215 and an aberration compensated image is computed for each and every image as the display changes over time. For example, steps 210 and 215 need only be performed once, and thereafter steps 220, 230 and 240 are repeatedly performed as shown in FIG. 13 for each image of a sequence of two or more images using the same aberration parameter(s) received in step 210 and the same mathematical construct from step 215. It should be clear to one skilled in the art that the present embodiments are not limited to processing of a static image but, given the data of the eye correction of the viewer, that a sequence of images (e.g., video, animation, etc) can be computed, each of which has undergone the inverse blurring transformation process to produce inverse blurred images which are then viewed through the light field element (i.e. parallax barrier such as pinhole array mask or an element comprising lenses including, but not limited to, a microlens array, lenslet array, lenticular array, lenticular lens, or lenticular screen.)

In some embodiments, code including instructions for execution by a processing element for implementing the aberration correction methods and/or prefiltering methods may be stored on a non-transitory computer-readable medium such as a CD, DVD, thumb drive or other non-transitory storage medium.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosed embodiments and does not pose a limitation on the scope of the embodiments unless otherwise claimed. No language in the specification should be construed as indicating any non-claimed element as essential to the practice of the embodiments of the disclosure.

Certain embodiments of this invention are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A display device that compensates for at least one optical aberration in a vision system of an external viewer viewing a display, the display device comprising:
   a display medium comprising an array of pixels;
   a light field element; and
   a processor element that:
   receives image data for an image to be displayed the image data including pixel values;
   computes an aberration compensated image based on at least one input parameter related to the at least one optical aberration in the vision system of the external viewer and on at least one characteristic of the light field element; and
   renders the aberration compensated image on the display medium, such that when the external viewer whose vision system has the at least one optical aberration views the aberration compensated image displayed on the display medium through the light field element, the aberration compensated image appears to the external viewer with the at least one aberration reduced or eliminated.

2. The display device of claim 1, wherein the at least one aberration is a lower order aberration.

3. The display device of claim 2, wherein the lower order aberration or aberrations are selected from the group consisting of piston, tip (prism), tilt (prism), defocus and astigmatism.

4. The display device of claim 1, wherein the at least one aberration is a higher order aberration.

5. The display device of claim 4, wherein the higher order aberration or aberrations are selected from the group consisting of trefoil, coma, quadrafoil, secondary astigmatism, and spherical aberration.

6. The display device of claim 1, wherein the at least one aberration includes at least one lower order aberration and at least one higher order aberration.

7. The display device of claim 1, wherein the at least one parameter includes a value selected from the group consisting of a spherical correction value, a cylindrical correction value, and an axis value.

8. The display device of claim 1, wherein the light field element includes a parallax barrier mask.

9. The display device of claim 8, wherein the parallax barrier mask is a pinhole array.

10. The display device of claim 1, wherein the light field element includes an element selected from the group consisting of a microlens array, a lenslet array, a lenticular array, a lenticular lens and a lenticular screen.

11. The display device of claim 1, wherein the at least one characteristic of the light field element includes an offset distance between the light field element and the display medium and/or a distance between features of the light field element.

12. The display device of claim 11, wherein said features include a distance between lenslets, or a distance between pinholes.

13. The display device of claim 1, wherein that the processor element computes an aberration compensated image includes the processor element applying an inverse blurring algorithm to the image data.

14. The display device of claim 1, wherein the display medium comprises one of a clock face, a watch screen, a wrist-worn screen, a cell phone screen, a mobile phone screen, a smartphone screen, a tablet display screen, a laptop display screen, a computer monitor, a computer display screen, a touch-screen display, an e-reader, a display screen on a camera, and a display screen on a video camera.

15. The display device of claim 1, wherein the display medium comprises one of a touch-screen display, a projection display, a heads-up display, a near-eye display, a television display or a home theater display.

16. The display device of claim 1, wherein the display medium is an instrument or gauge or display in an airborne, waterborne or landborne vehicle.

17. The display device of claim 1, wherein an intensity value of a pixel of the aberration compensated image is a function of intensity values of multiple pixels of the image data.

18. The display device of claim 1, wherein the image data includes picture and/or text data.

19. A method, implemented in a system including a display, of compensating for at least one optical aberration in a vision system of an external viewer viewing the display, the display including a display medium comprising an array of pixels, and the display including a light field element, the method comprising:
   receiving image data for an image to be displayed, the image data including pixel values;
   receiving at least one parameter related to at least one optical aberration in the vision system of the external viewer;
   computing, in a processing element of the system, an aberration compensated image to be displayed based on the at least one received parameter related to the vision system of the external viewer and on at least one characteristic of the light field element; and displaying or rendering the aberration compensated image on the display medium, such that when the external viewer whose vision system has the at least one optical aberration views the aberration compensated image displayed on the display medium through the light field element, the aberration compensated image appears to the external viewer with the at least one aberration reduced or eliminated.

20. The method of claim 19, wherein the at least one aberration includes a lower order aberration and/or a higher order aberration.

\* \* \* \* \*